Oct. 2, 1928.                                            1,686,054
E. WILDHABER
METHOD OF GENERATING BEVEL GEARS
Filed Feb. 28, 1927          2 Sheets-Sheet 1

INVENTOR
Ernest Wildhaber
BY
ATTORNEY

Oct. 2, 1928.                                                    1,686,054
                        E. WILDHABER
               METHOD OF GENERATING BEVEL GEARS
                    Filed Feb. 28, 1927          2 Sheets-Sheet 2

INVENTOR
*Ernest Wildhaber*
BY
ATTORNEY

Patented Oct. 2, 1928.

1,686,054

UNITED STATES PATENT OFFICE.

ERNEST WILDHABER, OF BROOKLYN, NEW YORK, ASSIGNOR TO GLEASON WORKS, OF ROCHESTER, NEW YORK, A CORPORATION OF NEW YORK.

METHOD OF GENERATING BEVEL GEARS.

Application filed February 28, 1927. Serial No. 171,610.

The present invention relates to a method of producing gears and particularly to a method of producing bevel gears having longitudinally curved teeth.

The primary object of this invention is to provide a simple and practical method for producing bevel gear pairs, in which the side tooth surfaces of each member of the pair may be cut two sides simultaneously, in such manner that the mating gears will mesh without "bias bearing".

A further object of this invention is to provide a method for cutting bevel gears, in which the toothed surface of each member of the pair may be cut two sides simultaneously in such manner that the teeth taper in depth along their length in proportion to the taper of the gear itself, with the tooth bottoms running substantially to the gear apexes, so that gears may be produced in a rapid operation which are just as strong as gears whose tooth surfaces are cut one side at a time.

A further object of this invention is to provide a method of cutting bevel gears two sides simultaneously which will permit of employing existing machinery in cutting both members of a pair.

Other objects of this invention will be apparent hereinafter from the specification and from the recital of the appended claims.

In the accompanying drawings, I have illustrated the preferred method of practising this invention in producing a bevel gear pair having longitudinally curved teeth. It will be understood, however, that the invention is capable of further modification within its scope and within the limits of the appended claims.

While the present invention may be applied to the production of straight tooth bevel gears, it is particularly applicable to the manufacture of curved tooth or spiral bevel gears and it is in connection with the latter type of gear that the invention is herein described.

A principal purpose of this invention is to permit of the cutting of both members of the bevel gear pair two sides simultaneously without bias bearing and with the requisite tooth strength, upon existing machinery. To this end, the gear or larger member of the pair is preferably cut in a generating operation in which the tool and blank are rolled relatively to each other, as through the pitch surface of the blank were rolling upon the pitch surface of a nominal crown gear, represented by the tool, and the pinion or smaller member of the pair, is produced in a generating operation, in which the tool represents a basic gear having conical top, pitch, and root surfaces and a pitch cone angle different from the pitch cone angle of the gear with which the pinion is to mesh. The gear or larger member of the pair can, accordingly be produced upon the standard Gleason spiral bevel gear generator, the structure of which is described generally in the patent to Gleason et al. No. 1,203,608, November 7, 1916. The gear may be cut, moreover, with a straight sided or conical rotary annular face mill, according to the usual method employed in cutting bevel gears "spread blade" that is, two sides simultaneously.

The pinion may be cut upon a machine such as described in my copending application No. 77,310, filed December 23, 1925. A special cutter is required for cutting the pinion. It will have finish cutting edges which are slightly convex.

Figure 1:
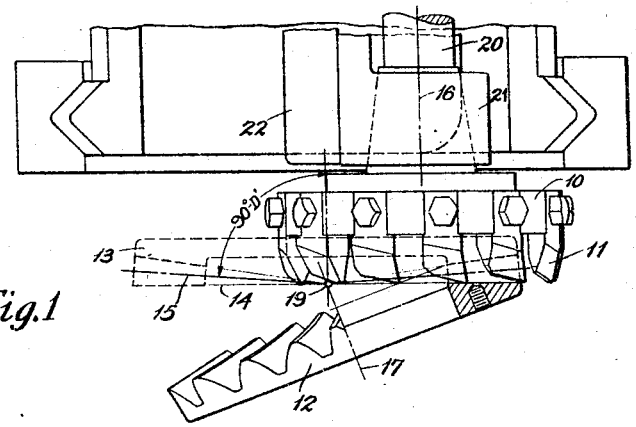
Figures 1 and 2 are a plan view and side elevation, respectively, illustrating diagrammatically the preferred method of producing the larger member of a longitudinally curved tooth bevel gear pair according to this invention.
Figure 2:
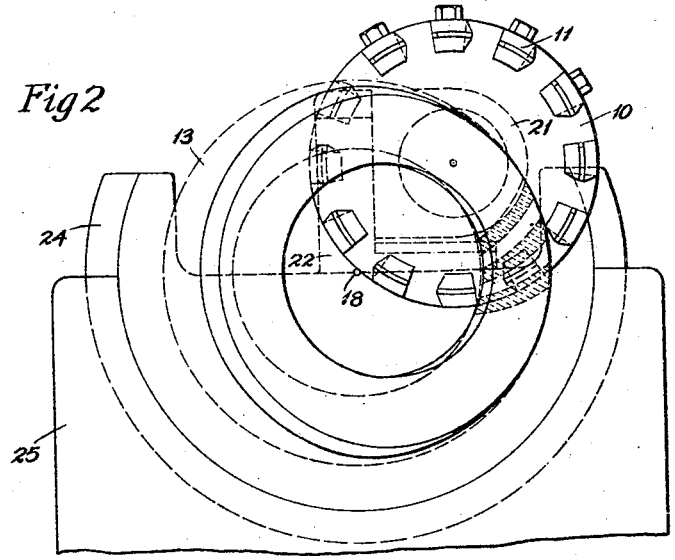
Figure 3:
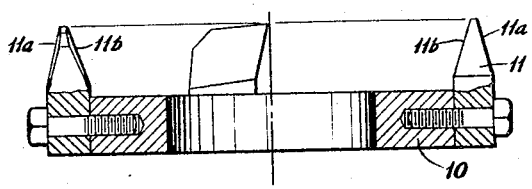
Figure 3 is a sectional view of the cutter or tool used in cutting this member.

The gear or larger member of the pair is produced in a manner similar to that employed, at the present time, in cutting bevel gears and particularly in cutting the larger member of a bevel gear pair "spread blade", or two sides simultaneously. The cutting tool employed will be preferably a rotary annular face mill, such as indicated at 10 in Figures 1, 2 and 3, provided with a plurality of cutting blades 11, which have finish cutting edges of straight profile. The gear blank to be cut is shown at 12. For generating the tooth profiles of the blank, the tool 10 is rotated in engagement with the blank and simultaneously the tool and blank are moved relatively to each other, as though the blank were rolling with a nominal crown gear 13 represented by the tool, having a plane top surface 14 and a conical pitch surface 15. In this generating operation, the tool 10 is rotated on its axis 16 and, preferably, the blank 12 is rotated on its axis 17, while simultaneously an additional relative movement is imparted between the tool 10 and blank 12 about an axis 18, representing the axis of the nominal crown gear 13, which axis 18 intersects the axis 17 of the blank in the blank apex 19.

The tool 10 is provided with cutting edges for finish cutting adjacent side tooth faces of the blank, so that, as the tool rotates in engagement with the blank two adjacent side tooth surfaces of the blank are cut simultaneously. To this end, each of the cutting blades 11 of the tool may be provided with two finish cutting edges, or alternate blades may be provided with finish cutting edges for finish cutting the adjacent side tooth faces of the blank. Each of the blades of the tool 10 shown have two finish cutting edges 11$^a$ and 11$^b$ of straight profile.

As stated, the gear, or larger member of a pair of longitudinally curved tooth bevel gears produced according to this invention, may be cut upon a Gleason spiral bevel gear generator. This type of machine is illustrated diagrammatically in Figures 1 and 2. The cutter head 10 is mounted upon a spindle 20 which is journaled in a support 21 that is adjustable upon an upright 22, which is in turn adjustably mounted upon the cradle 24. The cradle 24 is oscillatably mounted in the frame 25 of the machine. During the cutting operation of this machine, the tool 10 rotates in engagement with the blank, the blank rotates on its axis and simultaneously the cradle is moved on its axis. The axis of the cradle represents the axis of the basic gear 13 and thus a generating motion is produced between the tool and blank as though the blank were rolling with the basic gear 13. After two adjacent tooth sides of the blank have been cut, the tool and blank are withdrawn relatively to each other and the blank indexed. The tool and blank are then returned into engagement and the operation proceeds as before until the blank has been completed.

It is customary to cut the gear or larger member of the pair "spread blade", or two sides simultaneously, in a manner similar to that described, but when the pinion or mating gear is cut in a similar way, difficulty is experienced in eliminating "bias bearing" or a tooth surface contact which extends diagonally across the faces of the teeth when the mating gears are run together. It has been found that bias could be eliminated on both sides of the tooth surfaces simultaneously, if a somewhat large modification of the tooth profiles were permissible or practical. A large modification of the tooth profiles, such as would be accomplished by rolling the pinion on a taper gear instead of a crown gear for generation, would, however, produce tooth surfaces which were too much curved on both sides of the teeth and the tooth bearing would then be too narrow. I have discovered, however, that "bias bearing" may be eliminated by generating the pinion conjugate to a tapered gear which has a predetermined pitch cone angle and compensating for the resulting modification of the tooth profile by providing the cutter blades with convex profiles instead of straight. The pitch cone angle of the basic gear used in generating the pinion will be smaller than 90° and usually in the neighborhood of 82°. The cutting edge of the tool need only be slightly convex. For instance, for a rotary annular face mill of 9" cutter diameter, the cutter 30 (Fig. 6) employed in producing the pinion will usually have cutting blades 31, the profiles of whose finish cutting edges are curved on a radius of approximately 12".

Figure 4:
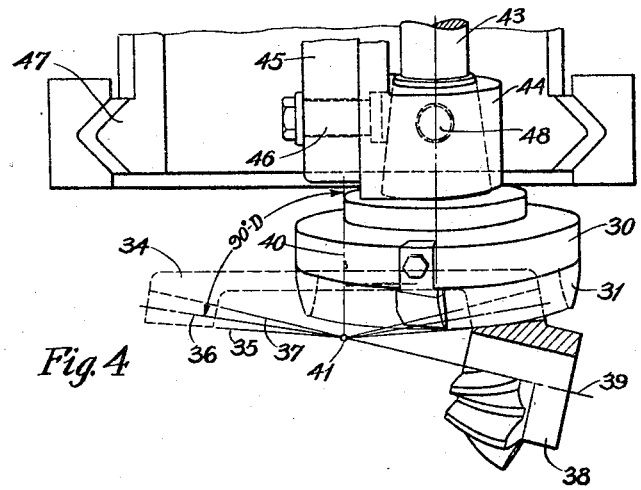
Figures 4 and 5 are a plan view and side elevation, respectively, illustrating diagrammatically the preferred method of producing a pinion or smaller member to mate with the gear cut according to the method illustrated in Figures 1 and 2.
Figure 5:
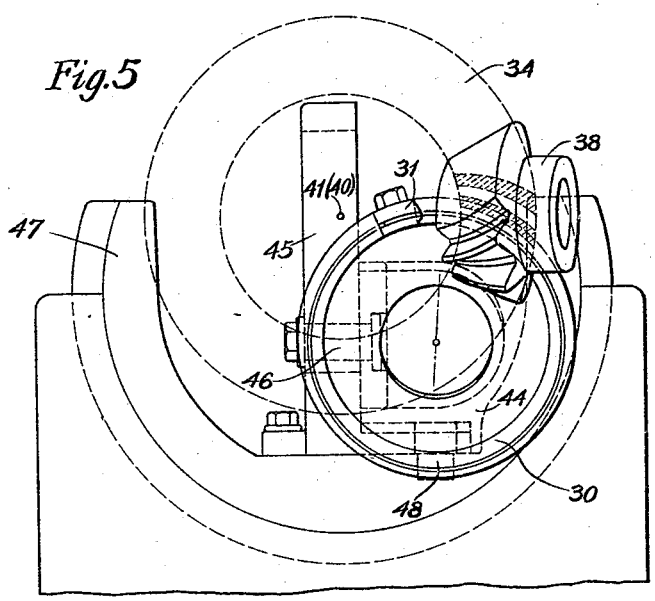
Figure 6:
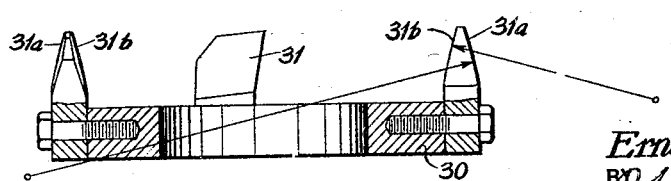
Figure 6 is a sectional view of the cutter used in producing the pinion.

The preferred method of producing the pinion is illustrated diagrammatically in Figs. 4 to 6. The cutter 30 employed is a rotary annular face mill provided with a plurality of cutting blades 31. The finish cutting edges 31$^a$ and 31$^b$ of these blades will be of convex profile as stated. Each blade may have two finish cutting edges, or alternate blades may be provided with finish cutting edges for finish cutting adjacent tooth faces of the blank. In both Figures 3 and 6, the tool shown is provided with blades so fashioned as to have, each of them, two finish cutting edges. These blades are preferably provided with a front rake, usually about 15°, so as to give them a good cutting action.

In the generation of the pinion, the cutter 30 represents a basic gear 34 which has conical top, pitch and root surfaces, respectively, 35, 36, and 37. The tool 30 is rotated in engagement with the pinion blank 38 while simultaneously the tool and blank are rolled together as though the blank were rolling with the taper basic gear 34. Preferably, this rolling motion comprises a rotation of the blank 38 upon its axis 39 and a simultaneous relative movement between the tool and blank about an axis 40 representing the axis of the basic gear 34 and intersecting the blank axis 39 in the blank apex 41.

The pinion can be readily cut upon a machine of the type described in my application No. 77,310, above referred to, since in such a machine the tool can be adjusted angularly about two axes at right angles to each other and positioned so as to represent a tooth surface or tooth surfaces of a basic gear, such as the gear 34, whose pitch cone angle is smaller than 90° and whose top and root surfaces are cones. The construction of a machine of the type described in this application is illustrated diagrammatically here in Figs. 4 and 5. In this machine the cutter head 30 is mounted upon a tool spindle 43 which is journaled in a support 44 which is angularly adjustable upon an upright 45, being pivotable about the stud 46. The upright 45 is in turn angularly adjustable upon the cradle 47, being pivotable thereon about a stud 48. The two angular adjustments in addition to the usual adjustments provided upon longitudinally curved tooth bevel gear cutting machines, permit of adjusting the cutter 30 about either or both axes 46 and 48 to represent a basic gear 34 of the type described.

During generation, the cutter 30 rotates in engagement with the blank 38, cutting out two adjacent tooth surfaces of the blank simultaneously, the blank rotates on its axis 39 and simultaneously the cradle is moved on its axis which represents the axis of the basic gear 34. After two tooth surfaces of the blank have been cut, the tool and blank are withdrawn relatively to each other and the blank indexed. The tool and blank are then returned into engagement and two other tooth surfaces of the blank are then generated. The operation then proceeds as before until the blank has been completed.

When a pair of mating gears have been produced in the manner described, they will mesh together without "bias bearing," their apexes will coincide, as usual in bevel gears, and they will transmit true uniform motion. Each gear may be cut with teeth of tapering depth and with tooth bottoms which run to their apexes, that is, lie on conical surfaces the apexes of which coincide with or substantially coincide with the pitch cone apexes of the blank. In this way, gears of satisfactory tooth bearing can be produced in a rapid operation and with teeth just as strong as gears cut one side at a time.

While in both instances, I have shown the tool mounted upon the cradle, it will be understood that the same generating motion can be obtained by mounting the blank upon the cradle and applying simply a cutting motion to the tool. It will be understood, also, that if desired the blank might be held stationary during the cut and all of the generating motion applied to the tool.

The radii of the transverse or cutting profiles of the tool to be employed in cutting the pinion, the form of the basic gear upon which the pinion is to be rolled, and the pressure angles of the cutting blades of the pinion cutter which are required to obtain bearing for a suitable length of the tooth face, can be determined as follows.

Let $(90-D)$ be the pitch cone angle of the basic gear upon which the pinion is to be rolled for generation, $d$ be the dedendum angle of the gear with which the pinion is to mesh, $h$ be the spiral angle or tooth inclination angle, at a mean point of contact with the mate gear, $A$ be the cone distance of the pinion, that is, the distance from the pinion apex to the mean point of contact, $r$ be the average cutter radius, that is, the distance from the center or axis about which the tool rotates to the mean point of contact and let $s$ be a pitch line element of the blank.

Now the inclination of the tooth normal to the pitch surface of the crown gear or basic gear from which the pinion is generated changes at various points on the pitch lines of the crown gear or basic gear, due to the inclination of the cutter axis to the basic gear axis. This is true of the pinion also. The tooth normal has one inclination at the mean point of contact between basic gear and pinion and another inclination at some other point in the pitch lines. The increment or decrement ($a'$) of the tooth normal can be expressed as follows:

$$a' = \frac{1}{\cos a}\left[ \mp \cos a \cdot d \cdot \cos h \cdot \frac{s}{r} \pm \cos h \cdot \cos a \cdot \frac{s \cdot \sin h}{A} \tan D \right],$$

where $a$ is the inclination of the tooth normal at the mean contact point or the pressure angle. Inasmuch as we consider the pitch lines, the pressure angle will be the same for the crown gear or basic gear and the pinion blank.

The equation just given can be simplified to:

$$a' = \frac{s}{A} \cos h \left[ \mp \frac{A}{r} d \pm \sin h \tan D \right]$$

On the gear or other member of the pair, the increase in pressure angle for the same point when it becomes a point of contact between gear and pinion is:

$$a' = \frac{s}{A} \cos h \left[ \pm \frac{A}{r} d' \mp \sin h \tan D' \right],$$

where $d'$ is the dedendum angle of the pinion and $D'$ is, as will be pointed out below, the dedendum angle of the gear.

The increment of pressure angle, $a'$ must evidently be the same on both members of the pair, hence:

$$\mp \frac{A}{r}(d+d') = \mp \sin h (\tan D + \tan D')$$

Now where the gear or larger member of the pair is cut upon a standard Gleason bevel gear generator, as is preferable, the pitch angle of the basic gear, the nominal crown gear 13, is 90°−D′ which equals 90°−dedendum angle of the gear to be produced. Hence, the pitch angle (90°−D) of the basic gear corresponding to the pinion can be determined as follows:

$$\tan D = \frac{A}{r \sin h}(d+d') - \tan d \quad (1)$$

and:

$$\tan D + \tan D' = \frac{A}{r \sin h}(d+d')$$

In order to be able to cut the tooth bottom towards, in line with, the blank apex, the spiral angle $h$, the cone distance $A$ and the cutter radius $r$ must have the same interrelation as in the case of bevel gears produced with a spherical cutter, namely:

$$\left(1 - \frac{A}{r}\sin h\right) = \frac{4}{\pi}\tan a \cdot D_0 \cos h,$$

where $D_0$ is the average dedendum for one diametrical pitch. $D_0$ usually equals 1.2.

The radius of curvature of the normal tooth profile of a basic gear, such as the gear 34, whose pitch cone angle is 90°−D is:

$$\frac{A \sin a}{\cos^2 h \tan D},$$

if the true crown gear has a straight normal profile. The pinion cutter is, therefore, provided with a cutting profile of this radius, when full profile match between the tooth surfaces of the gear and pinion is desired.

While for practical reasons, it is preferable to use a straight sided cutter on the gear, the profile curvature might be split up between the gear and pinion cutters. For instance, the profiles of the cutting edges of the two cutters might be made of equal curvature, in which case the profile radius would be twice the above amount or:

$$\frac{2 A \sin a}{\cos^2 h \tan D}$$

Any desired lengthwise mismatch of the tooth surfaces of the gear and pinion produced according to this invention can be obtained by varying the inclination of the outside and inside cutting edges of the tool and setting the cutter on the generator in correspondence with such inclination.

While I have deemed it preferable to cut both members of a pair of curved tooth bevel gears according to this invention with rotary annular face mills, it is also possible to cut either or both members with planing tools which move in arcuate paths. The present invention may be applied to grinding and lapping and is not confined to the production of gears with milling or planing tools, and it will be understood that the term "cutting" as used in the specification and claims is intended to cover any of these operations.

In general, while I have described my invention with reference to a particular embodiment, it will be understood the invention is capable of further modification within the limits of the disclosure and the scope of the appended claims and that this application is intended to cover any variations, uses or adaptations in my invention, following, in general, the principles of the invention and including such departures from the present disclosure as come within known or customary practise in the gear art and as may be applied to the essential features hereinbefore set forth and as fall within the limits of the accompanying claims.

Having thus described my invention, what I claim is:

1. A method of producing a bevel gear which consists in cutting each of its side tooth surfaces by moving a tool having a cutting edge of convex profile, across the face of a tapered gear blank while imparting a relative rolling movement between the tool and blank as though the blank were rolling with a basic gear having conical top, pitch, and root surfaces, and a pitch cone angle different from the pitch cone angle of its mating gear.

2. The method of producing a bevel gear which consists in cutting each of its side tooth surfaces by moving a tool, having a cutting edge of convex profile, in a curved path across the face of a tapered gear blank, while imparting a relative rolling movement between the tool and blank as though the blank were rolling with a basic gear having conical top, pitch, and root surfaces and a pitch cone angle different from the pitch cone angle of its mating gear.

3. The method of producing a bevel gear which consists in cutting each of its side tooth surfaces with a rotary annular face mill, having a plurality of cutting edges of convex profile, by rotating said tool in engagement with a tapered gear blank while imparting a relative rolling movement between the tool and blank as though the blank were rolling with a basic gear having conical top, pitch, and root surfaces, and a pitch cone angle different from the pitch cone angle of its mating gear.

4. The method of producing a bevel gear which consists in finish cutting its side tooth surfaces two sides simultaneously, by moving a pair of cutting edges, each of which is of convex profile, across the face of a tapered gear blank while imparting a relative rolling movement between the cutting edges and blank as though the blank were rolling with a basic gear having a conical pitch surface whose pitch cone angle is different from the pitch cone angle of a mating gear.

5. The method of producing a bevel gear which consists in finish cutting its side tooth surfaces two sides simultaneously by moving a pair of cutting edges, each of which is of convex profile, across the face of a tapered gear blank while imparting a relative rolling movement between said cutting edges and blank as though the blank were rolling with a basic gear having conical top, pitch, and root surfaces and a pitch cone angle different from the pitch cone angle of the mate gear.

6. The method of producing a bevel gear which consists in finish cutting its side tooth surfaces two sides simultaneously by moving a pair of cutting edges, each of which is of convex profile, in separate concentrically curved paths across the face of a tapered gear blank while imparting a relative rolling movement between the cutting edges and blank as though the blank were rolling with a basic gear having a conical pitch surface whose pitch cone angle is different from the pitch cone angle of a mating gear.

7. The method of producing a bevel gear which consists in finish cutting its side tooth surfaces two sides simultaneously with a rotary annular face mill, provided with cutting edges, each of which is of convex profile, adapted to finish cut adjacent side tooth faces of a blank, by rotating said tool in engagement with a tapered gear blank, while imparting a relative rolling movement between the tool and blank as though the blank were rolling with a basic gear having a conical pitch surface whose pitch cone angle is different from the pitch cone angle of a mating gear.

8. The method of producing a bevel gear which consists in finish cutting its side tooth surfaces two sides simultaneously by moving a pair of cutting edges, each of which is of convex profile, in separate concentrically curved paths across the face of a tapered gear blank while imparting a relative rolling movement between the cutting edges and blank as though the blank were rolling with a basic gear having conical top, pitch, and root surfaces and a pitch cone angle different from the pitch cone angle of a mate gear.

9. The method of producing a bevel gear which consists in finish cutting its side tooth surfaces two sides simultaneously with a rotary annular face mill, provided with cutting edges, each of which is of convex profile, adapted to finish cut adjacent side tooth faces of a blank, by rotating said tool in engagement with a tapered gear blank while imparting a relative rolling movement between the tool and blank as though the blank were rolling with a basic gear having, conical top, pitch, and root surfaces and a pitch cone angle different from the pitch cone angle of a mate gear.

10. The method of producing a pair of bevel gears which consists in cutting the side tooth surfaces of one member of the pair by moving a cutting edge of straight profile across the face of a tapered gear blank while imparting a relative rolling movement between the tool and blank as though the blank were rolling on a basic gear having a plane top surface and a conical pitch surface, and in cutting the side tooth surfaces of the other member by moving a cutting edge of convex profile across the face of a tapered gear blank while imparting a relative rolling movement between said latter cutting edge and blank as though the blank were rolling with a basic gear having conical top, pitch and root surfaces.

11. The method of producing a pair of bevel gears, which consists in cutting the side tooth surfaces of one member by moving a cutting edge of straight profile across the face of a tapered gear blank while imparting a relative rolling movement between the tool and blank as though the blank were rolling on a basic gear having a plane top surface and a conical pitch surface, and in cutting the side tooth surfaces of the other member by moving a cutting edge of convex profile across the face of a tapered gear blank while imparting a relative rolling movement between said latter cutting edge and blank as though the blank were rolling with a basic gear having conical top, pitch, and root surfaces and a pitch cone angle different from the pitch cone angle of the mate gear.

12. The method of cutting a pair of bevel gears which consists in cutting the side tooth surfaces of one member of the pair two sides simultaneously by moving a pair of cutting edges of straight profile across the face of a tapered gear blank while imparting a relative rolling movement between the cutting edges and blank as though the blank were rolling on a basic gear having a plane top surface and a conical pitch surface, and in cutting the side tooth surfaces of the other member of the pair two sides simultaneously by moving a pair of cutting edges of convex profile across the face of a tapered gear blank while imparting a relative rolling movement between the latter cutting edges and blank as though the blank were rolling with a basic gear having conical top, pitch, and root surfaces.

13. The method of cutting a pair of bevel gears which consists in cutting the side tooth surfaces of one member of the pair two sides simultaneously by moving a pair of cutting edges of straight profile across the face of a tapered gear blank while imparting a relative rolling movement between the cutting edges and blank as though the blank were rolling on a basic gear having a plane top surface and a conical pitch surface, and in cutting the side tooth surfaces of the other member of the pair two sides simultaneously by moving a pair of cutting edges of convex profile, across the face of a tapered gear blank while imparting a relative rolling movement between the latter cutting edges and blank as though the blank were rolling with a basic gear having conical top, pitch and root surfaces and a pitch cone angle different from the pitch cone angle of the mate gear.

14. The method of cutting a pair of tapered gears which consists in cutting the side tooth surfaces of one member of the pair by moving a cutting edge of straight profile in a curved path across the face of a tapered gear blank while rotating the blank on its axis and simultaneously imparting an additional relative movement between the cutting edge and blank about an axis parallel to the axis about which the tool moves, and in cutting the side tooth surfaces of the other member of the pair by moving a cutting edge of convex profile in a curved path across the face of a tapered gear blank while rotating the blank on its axis and simultaneously imparting an additional relative movement between the latter cutting edge and blank about an axis inclined to the axis about which the latter tool moves.

15. The method of cutting a pair of tapered gears which consists in cutting the side tooth surfaces of one member of the pair by moving a cutting edge of straight profile in a curved path across the face of a tapered gear blank while rotating the blank on its axis and simultaneously imparting an additional relative movement between the tool and blank about an axis which intersects the blank axis in its apex and is parallel to the axis about which the tool moves, and in cutting the side tooth surfaces of the other member of the pair by moving a cutting edge of convex profile in a curved path across the face of a tapered gear blank while rotating the blank on its axis and simultaneously imparting an additional relative movement between the latter cutting edge and blank about an axis which intersects the blank axis in its apex and which is inclined to the axis about which the latter tool moves.

16. The method of cutting a pair of tapered gears which consists in cutting the side tooth surfaces of one member of the pair two sides simultaneously by moving a pair of cutting edges of straight profile in separate concentrically curved paths across the face of a tapered gear blank while imparting a relative rolling movement between the cutting edges and blank as though the blank were rolling with a basic gear having a plane top surface and a conical pitch surface, and in cutting the side tooth surfaces of the other member of the pair two sides simultaneously by moving a pair of cutting edges of convex profile in separate concentrically curved paths across the face of a tapered gear blank while imparting a relative rolling movement between the latter cutting edges and blank as though the blank were rolling with a basic gear having conical top, pitch, and root surfaces.

17. The method of cutting a pair of tapered gears which consists in cutting the side tooth surfaces of one member of the pair by moving a cutting edge of straight profile in a curved path across the face of a tapered gear blank while imparting a relative rolling movement between the cutting edge and blank as though the blank were rolling with a basic gear having a plane top surface and a conical pitch surface and in cutting the other member of the pair by moving a cutting edge of convex profile in a curved path across the face of a tapered gear blank while imparting a relative rolling movement between the latter cutting edge and blank as though the blank were rolling with a basic gear having conical top, pitch and root surfaces.

18. The method of cutting a pair of tapered gears which consists in cutting the side tooth surfaces of one member of the pair with a rotary annular face mill, having a plurality of cutting edges of straight profile, by rotating said tool in engagement with a tapered gear blank while rotating the blank on its axis and simultaneously imparting an additional relative movement between the tool and blank about an axis parallel to the rotary axis of the tool, and in cutting the side tooth surfaces of the other member of the pair with a rotary annular face mill, having a plurality of cutting edges of convex profile, by rotating the latter tool in engagement with a tapered gear blank while rotating the blank on its axis and simultaneously imparting an additional relative movement between the latter tool and blank about an axis inclined to the axis about which the latter tool rotates.

19. The method of cutting a pair of tapered gears which consists in cutting the side tooth surfaces of one member of the pair with a rotary annular face mill, having a plurality of cutting edges of straight profile, by rotating said tool in engagement with a tapered gear blank while rotating the blank on its axis and simultaneously imparting an additional relative movement between the tool and the blank about an axis which intersects the blank axis in its apex and is parallel to the rotary axis of the tool, and in cutting the side tooth surfaces of the other member of the pair with a rotary annular face mill, having a plurality of cutting edges of convex profile, by rotating the latter tool in engagement with a tapered gear blank while rotating the blank on its axis and simultaneously imparting an additional relative movement between the latter tool and blank about an axis which intersects the blank axis in its apex and is inclined to the axis about which the latter tool rotates.

20. The method of cutting a pair of tapered gears which consists in cutting the side tooth surfaces of one member of the pair two sides simultaneously with a rotary annular face mill, having cutting edges of straight profile, adapted to finish cut opposite side tooth faces of the blank, by rotating said tool in engagement with a tapered gear blank while rotating the blank on its axis and simultaneously imparting an additional relative movement between the tool and blank about an axis parallel to the axis about which the tool rotates, and in cutting the side tooth surfaces of the other member of the pair with a rotary annular face mill, having finish cutting edges of convex profile adapted to finish cut adjacent side tooth faces of a gear blank, by rotating the latter tool in engagement with a tapered gear blank while rotating the blank on its axis and simultaneously imparting an additional relative movement between the latter tool and blank about an axis inclined to the axis about which the latter tool rotates.

21. The method of cutting a pair of tapered gears which consists in cutting the side tooth surfaces of one member of the pair with a rotary annular face mill, having cutting edges of straight profile adapted to finish cut adjacent side tooth faces of a tapered gear blank, by rotating the tool in engagement with a tapered gear blank while rotating the blank on its axis and simultaneously imparting an additional relative movement between the tool and blank about an axis which intersects the blank axis in its apex and which is parallel to the axis about which the tool rotates, and in cutting the side tooth surfaces of the other member of the pair, with a rotary annular face mill, having cutting edges of convex profile adapted to finish cut adjacent side tooth faces of a gear blank, by rotating the latter tool in engagement with a tapered gear blank while rotating the blank on its axis and simultaneously imparting an additional relative movement between the latter tool and blank about an axis which intersects the blank axis in its apex and is inclined to the axis about which the latter tool rotates.

22. The method of cutting a pair of bevel gears which consists in cutting the side tooth surfaces of one member of the pair by moving a cutting edge of straight profile in a curved path across the face of a tapered gear blank while imparting a relative rolling movement between the cutting edge and blank as though the blank were rolling with a basic gear having a plane top surface and a conical pitch surface and in cutting the side tooth surfaces of the other member of the pair by moving a cutting edge of convex profile in a curved path across the face of a tapered gear blank while imparting a relative rolling movement between the latter cutting edge and blank as though the blank were rolling with a basic gear having conical top, pitch and root surfaces and a pitch cone angle different from the pitch cone angle of the mate gear.

23. The method of cutting a pair of bevel gears which consists in cutting the side tooth surfaces of one member of the pair two sides simultaneously by moving a pair of cutting edges of straight profile in separate concentrically curved paths across the face of a tapered gear blank while imparting a relative rolling movement between the cutting edges and blank as though the blank were rolling with a basic gear having a plane top surface and a conical pitch surface and in cutting the side tooth surfaces of the other member of the pair two sides simultaneously by moving a pair of cutting edges of convex profile in concentrically curved paths across the face of a tapered gear blank while imparting a relative rolling movement between the latter cutting edges and blank as though the blank were rolling with a basic gear having conical top, pitch, and root surfaces and a pitch cone angle different from the pitch cone angle of the mate gear.

24. The method of producing a pair of bevel gears which consists in cutting the side tooth surfaces of one member of the pair, two sides simultaneously with a rotary annular face mill, provided with cutting edges of straight profile adapted to finish cut adjacent side tooth faces of a gear blank by rotating said tool in engagement with a tapered gear blank while imparting a relative rolling movement between the tool and blank as though the blank were rolling with a basic gear having a plane top surface and a conical pitch surface, and in cutting the side tooth surfaces of the other member of the pair two sides simultaneously with a rotary annular face mill, provided with cutting edges of convex profile adapted to finish cut adjacent side tooth faces of a gear blank, by rotating the latter tool in engagement with a tapered gear blank while imparting a relative rolling movement between the latter tool and blank as though the blank were rolling with a basic gear having conical top, pitch, and root surfaces and a pitch cone angle different from the pitch cone angle of the mate gear.

25. The method of producing a pair of bevel gears which consists in cutting the side tooth surfaces of both members of the pair two sides simultaneously with a rotary annular face mill, having cutting edges adapted to finish cut adjacent side tooth faces of a gear blank, one member of the pair being cut in a generating operation in which the tool is rotated in engagement with a tapered gear blank while the blank is rotated on its axis and simultaneously an additional relative movement is imparted between the tool and blank about an axis intersecting the blank axis and parallel to the tool axis, the other member of the pair being cut in a generating operation in which the tool is rotated in engagement with a tapered gear blank while the blank is rotated on its axis and simultaneously an additional relative movement is imparted between the tool and blank about an axis intersecting the blank axis and angularly inclined to the tool axis.

26. The method of producing a pair of bevel gears, which consists in cutting the side tooth surfaces of both members of the pair two sides simultaneously, by moving a pair of cutting edges in separate concentrically curved paths across the face of the gear blank, one member of the pair being cut in a generating operation in which during the cutting movement of the cutting edges, the blank is rotated on its axis and simultaneously an additional relative movement is imparted between the cutting edges and blank about an axis which intersects the blank axis in its apex and is parallel to the axis about which the cutting edges move, and the other member of the pair being cut in a generating operation in which, during the cutting movement of the cutting edges, the blank is rotated on its axis and simultaneously an additional relative movement is imparted between the cutting edges and blank about an axis which intersects the blank axis in its apex and is angularly inclined to the axis about which the cutting edges move.

27. The method of producing a pair of bevel gears which consists in cutting the side tooth surfaces of one member of the pair by moving a pair of cutting edges of straight profile in concentric curved paths across the face of a tapered gear blank while imparting a relative rolling movement between the tool and blank, and in cutting the side tooth surfaces of the other member of the pair by moving a pair of cutting edges of convex profile in separate concentrically curved paths across the face of a tapered gear blank while imparting a relative rolling movement between the tool and blank in the manner of a gear rolling with a basic gear, represented by the tool, having a conical pitch surface.

28. The method of producing a pair of bevel gears which consists in cutting the side tooth surfaces of one member of the pair two sides simultaneously with a rotary annular face mill, having a plurality of cutting edges of straight profile adapted to finish cut adjacent side tooth faces of a gear blank, by rotating the tool in engagement with a tapered gear blank while imparting a relative rolling movement between the tool and blank, and in cutting the side tooth surfaces of the other member of the pair two sides simultaneously with a rotary annular face mill, having a plurality of finish cutting edges of convex profile adapted to finish cut adjacent side tooth faces of a gear blank, by rotating said tool in engagement with a tapered gear blank while imparting a relative rolling movement between the tool and blank in the manner of a gear rolling with a basic gear, represented by the latter tool, having a conical pitch surface.

ERNEST WILDHABER